Feb. 28, 1950     T. A. RICH     2,499,198
RECORDING VOLTMETER
Filed June 28, 1947     2 Sheets-Sheet 1
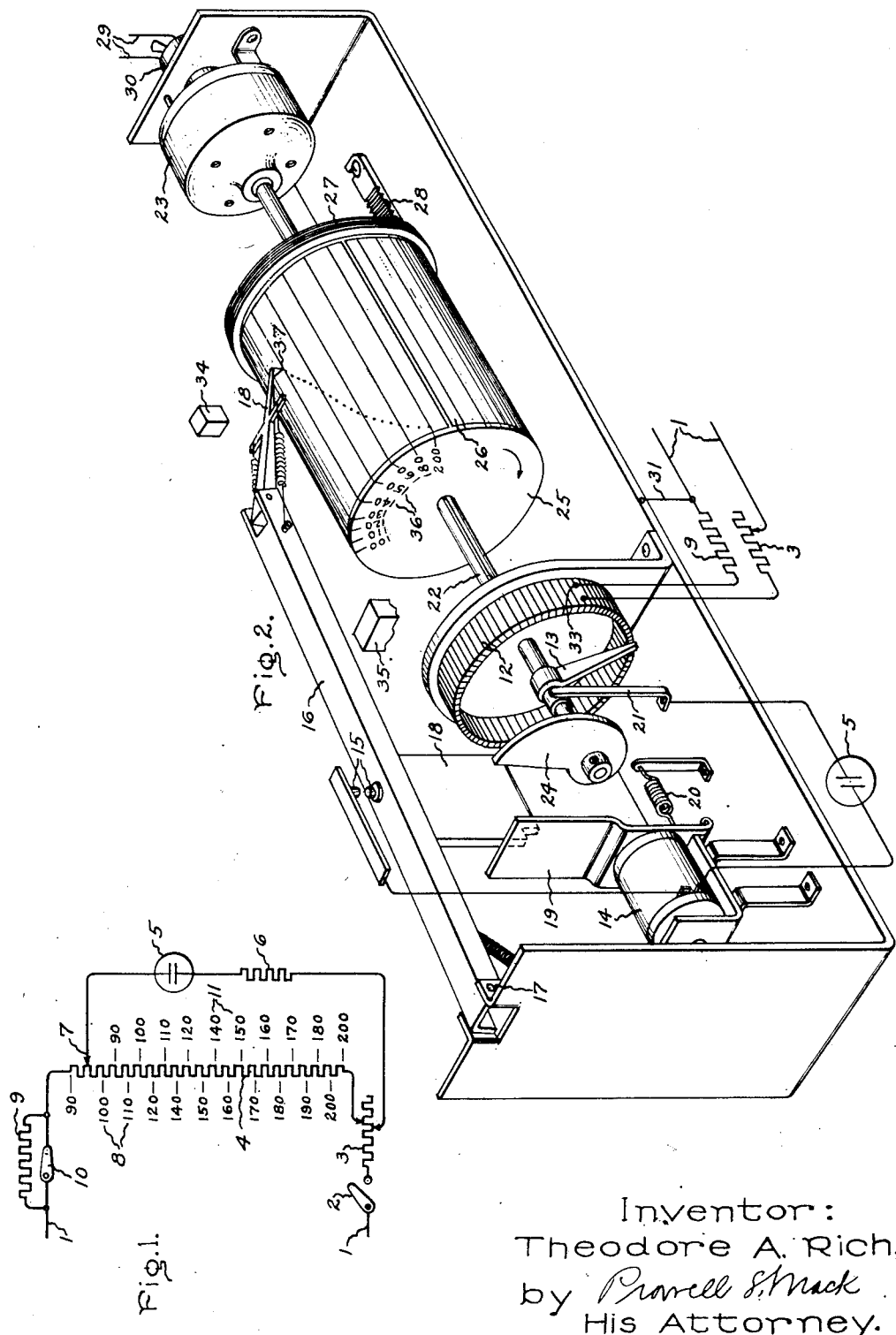
Inventor:
Theodore A. Rich,
by Powell S. Mack
His Attorney.

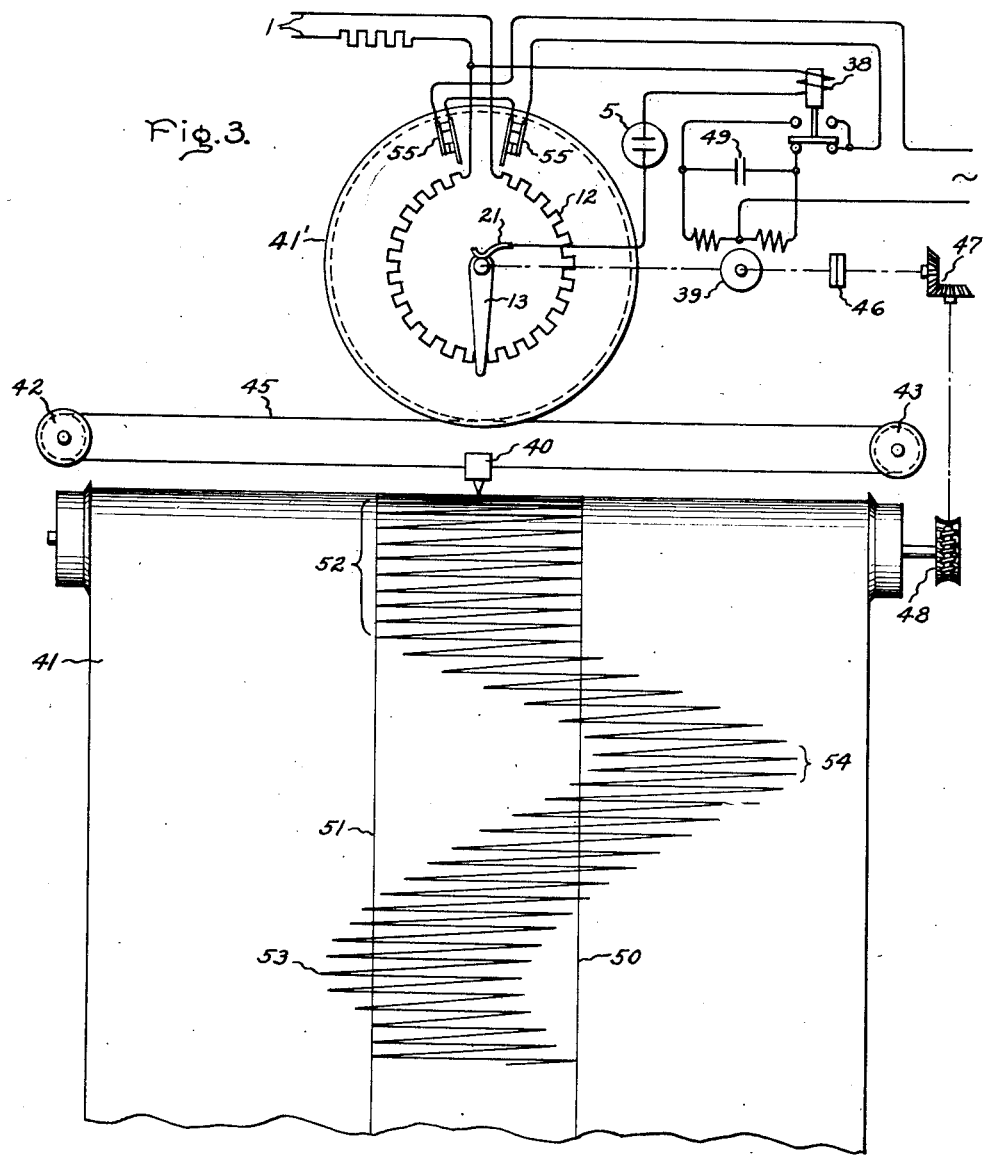

Patented Feb. 28, 1950

2,499,198

UNITED STATES PATENT OFFICE 2,499,198

RECORDING VOLTMETER

Theodore A. Rich, Schenectady, N. Y., assignor to General Electric Company, a corporation of New York Application June 28, 1947, Serial No. 757,830

4 Claims. (Cl. 346—33)

My invention relates to voltmeters employing a glow tube which breaks down at a known predetermined voltage as the voltage across the same is gradually increased, or which goes out as the voltage across the same is gradually decreased, or both. In such a voltmeter a resistance connected across the source of voltage to be measured is provided with a voltage scale, and a sliding potentiometer contact connected in series with the glow tube to one side of the source is moved along such resistance. The point along the resistance where the tube breaks down will vary with the source voltage and when the scale has once been calibrated with the glow tube in combination with an accurate voltmeter, the arrangement makes a simple, low-cost voltage measuring scheme. The rush of current through the glow tube at the breakdown voltage may be used in combination with relay-operated recorder means to provide a rugged, low-cost recording voltmeter.

The features of my invention which are believed to be novel and patentable will be pointed out in the claims appended hereto. For a better understanding of my invention reference is made in the following description to the accompanying drawings in which Fig. 1 represents a manually operated voltmeter embodying my invention; Fig. 2 shows the invention as applied to an automatic voltage recorder for obtaining frequent voltage records over a relatively short period of time; and Fig. 3 represents the invention as applied to an automatic voltage recorder for continuous operation.

Referring now to Fig. 1, I represents terminals across which a voltage appears which it is desired to measure; connected across these terminals through a switch 2 and adjustable calibrating resistor 3 is a graduated resistance 4. A glow tube 5 is arranged to be connected across any desired portion of the graduated resistor 4 through a current limiting resistor 6 and a sliding contact 7 which may be moved along resistor 4 in contact therewith. A glow discharge tube such as represented at 5 has a breakdown voltage within narrow limits. Thus, the tube 5 may have a breakdown voltage of 90 volts and will repeatedly break down within 0.1 per cent of such voltage. If, then, a voltage in excess of 90 volts is applied across terminals 1, and the slider 7 is at the bottom end of resistor 4 and is moved upward on resistor 4 so as to gradually increase the voltage across tube 5, the tube will break down when the slider reaches a position such that 90 volts is applied thereto. If the voltage across terminals 1 is only slightly above 90 volts, the breakdown position for slider 7 will be near the top of resistor 4. If the voltage across terminals 1 is higher, the breakdown position for slider 7 will be lower down on resistor 4. If we connect an accurate voltmeter across terminals 1 and vary the voltage across such terminals and move slider 7 from the bottom to the top of resistor 4, we may mark the various positions of slider 7 where the tube 5 breaks down with the voltage across terminals 1, and so provide resistor 4 with a calibrated voltage scale 8 such as is shown at the left thereof. The parts shown may thereafter be used as a voltmeter by simply moving the slider 7 from the bottom end of resistor 4 with the tube 5 extinguished, up along resistor 4 until the tube breaks down, and then read the voltage across terminals 1 on the scale 8. The range of the voltmeter may be readily changed. Thus at 9 there is represented a resistor which we will assume is of the same value as the resistor 4. If, then, this resistor be included in the circuit by opening switch 10, the voltage appearing on scale 8 should be multiplied by two to obtain the voltage across terminals 1. The resistor shown at 3 is of a relatively low value and both the circuit through 4 and tube 5 are adjustable along resistor 3. This may be useful during initial calibration or when the range is changed, or for recalibration for slight changes in resistance in some part of the circuit, or changes in the characteristics of tube 5 due to aging, etc.

The tube 5 also has a rather definite extinguishing voltage, although probably not so exact as its breakdown voltage. A glow discharge tube such as used at 5 which has a breakdown voltage of 90 volts will extinguish or go out at about 75 volts across it. If, then, in the operation of the voltmeter after the tube 5 has broken down, the slider be slowly moved from the breakdown point towards the bottom of resistor 5 to decrease the voltage across tube 5, a point will be reached where the tube goes out. The exact voltage position of slider 7 where this occurs will depend somewhat upon the value of the resistance 6 in series therewith, because when the tube is drawing current, there will be a voltage drop across resistor 6 so that the voltage position of slider 7 when the tube ceases passing current will be the extinguishing voltage of tube 5 plus the voltage across resistor 6. In any event, a second scale 11 shown on the right of resistor 4 may be provided from a second calibration of the apparatus, using the extinguishing voltage for the purpose of giving the voltage across terminals 1. In using the apparatus, either scale or both scales 8 and 11 may be used. Thus, with the tube 5 extinguished, the slider 7 is moved upward until tube 5 fires and the voltage at terminals 1 is read on scale 8. Then the slider is moved downward until the tube goes out and the terminal voltage is read on scale 11. This second reading can be used as a check on the first reading, unless the voltage is fluctuating rapidly because if the voltage does not change between the two readings, they will be the same. It is considered that the breakdown voltage reading will be the most reliable and accurate.

In Fig. 2 use is made of the glow tube measurement principle above described in an automatic voltage recorder where the current surge through tube 5 at the breakdown voltage is used to produce a record on a record sheet, whose movement is co-ordinated with a slider corresponding to 7, Fig. 1, at a corresponding voltage designating position.

In Fig. 2 the adjustable portion of the resistance corresponding to 4 in Fig. 1 is designated 12 and is in the form of resistance wire helix wound on a stationary circular form with one end of the circular helix exposed, so that a rotary wiper brush 13 may be moved along the resistance. Brush 13 corresponds to slider 7 of Fig. 1. Brush 13 is connected through a slip ring and stationary brush 21 in series with the glow tube 5, the coil of a relay 14, and a switch at 15 in part operated by the relay. The movable contact of switch 15 is on a recorder arm 16, hinged at 17 at one end and having a marking stylus 18 at its other end. The recorder arm 16 may be held in the raised non-recording position with the switch at 15 closed by a detent 18 and the armatunre 19 of the relay 14 when the relay is deenergized and the armature is held in engaging position with and beneath detent 18 by a spring 20.

The wiper 13 is on a shaft 22 rotated by a motor 23. Also rotated by shaft 22 is a cam finger 24 for lifting detent 18 and recorder arm 16 and a recorder drum 25 having thereon a suitable record sheet 26. The drum 25 is keyed to shaft 22, so that it may readily move endwise thereon while being driven. In order to have the drum 25 move along shaft 22 automatically as it is rotated, a worm gear 27 is provided at the periphery of one end of the drum and the worm gear meshes with a stationary toothed rack 28 such that as the drum is rotated clockwise, it will also move to the left a slight distance each revolution. At the beginning of a voltage recording operation the drum 25 is positioned to the right with the worm gear 27 meshing with the right end of rack 28, at which time the stylus 18 is in position to record at the left end of the drum. The motor 23 is connected to a source of supply indicated at 29 through a switch 30, so that it may readily be started and stopped. The chart 26 is intended to be changed whenever its recording surface has been sufficiently used up in making records to warrant a change, and at the time of such change the motor is of course stopped and the drum moved to the right to the beginning point. When the drum is moved endwise by hand, the rack 28 is arranged to be moved away from the drum so as to disengage the rack from the worm 27.

The voltage to be measured is applied at terminals 1 and, if suitable, the motor 29 may be supplied from this voltage source. One side 31 of source 1 is grounded to the metal framework of the recorder and is thus connected to the lower grounded terminal of switch 15. The resistance 12 is connected across terminals 1. The resistance of relay coil 14 may in part at least take the place of the current limiting resistance 6, Fig. 1, in the glow tube circuit. Assuming clockwise rotation of brush 13, the end 33 of resistance 12 nearest the brush in a counterclockwise direction from the brush will be connected to the side 31 of source 1, so that as the brush rotates with switch 15 closed, the voltage across glow tube 5 will be raised.

The voltage measuring circuit may include range changing and calibrating resistors such as indicated at 9 and 3. The cam 24 is adjustable on shaft 22 and set in such rotary position as will close the switch 15 near the beginning of the cycle of increasing voltage on the glow tube circuit and, of course, before the breakdown voltage has been reached. With the relative positions shown for the end of resistance 12 and the detent 18, the cam 24 should be positioned approximately 180 degrees from brush 13, such that as the brush moves on to the beginning end of resistance 12 at point 33, cam 24 will raise detent 18 and recording arm 16 and close the switch 15.

The stylus 18 is hinged to the recording end of arm 16 and has a toggle action between a lower recording position shown and a raised position limited by a stop 34. A stop 35 is provided beneath the recording arm to limit its downward motion when released by the operation of relay 14. When the recording arm is raised, the toggle stylus which is in the raised position strikes stop 34 which then moves the toggle to the lower position but out of contact with the chart because the recording arm 16 is now in the upper position.

In the illustration it is assumed that the glow tube 5 has just broken down, operated relay 14, and released detent 18; and that the recording arm is dropping and has brought the contact point of the toggle stylus into contact with chart 26 to produce a record. The arm 16 continues to drop until it strikes stop 35 and this further lowering of the arm 16, together with the rebound of the stylus, is sufficient to throw the toggle stylus to the upper position out of contact with the chart. As a result a point or dot-like record is made on the record sheet while being rotated by drum 25.

As explained in connection with Fig. 1, the tube breaks down at a resistance position of brush 13 which is related to the existing voltage of source 1 and, hence, the apparatus may be calibrated. The calibrated scale instead of being placed along resistor 12, is marked on the rotary drum as at 36 or on the chart 26, or both, and the record such as the dot at 37 just made by stylus 18 is the reference point or index for the scale. Thus, if we follow the horizontal line on the record sheet from dot 37 to the scale 36, we note that the voltage of source 1 for such record was 140 volts. In placing the chart 26 on the drum 25, the scale or the scale lines on the chart will be co-ordinated with the scale on the drum.

It is believed that the operation of the apparatus of Fig. 2 will be apparent from the foregoing operation, but such operation will now be briefly reviewed. With the motor 23 stopped, a chart 26 is placed on the drum 25 and its reference lines co-ordinated with scale 36. The rack 28 is withdrawn from worm wheel 27 and the drum positioned to the right and the rack replaced in mesh with worm wheel 27. The stylus 37 is positioned near the left end of the drum and chart thereon. The motor 23 is then started by closing switch 30. No particular rotary position of shaft 22 or raised or lowered position of arm 16 is required at the time of starting the motor, since by the time the drum has made a complete revolution the parts will co-ordinate themselves automatically. During each recording cycle or complete revolution of shaft 22 the following operations occur: When brush 13 rotating clockwise approaches point 33 of the resistance 12, cam 24 raises detent 18 and recorder arm 16 and closes switch 15. Movement of brush 13 clockwise beyond point 33 raises the voltage across glow tube 5. As the breakdown voltage is reached, relay 14 is energized attracting its armature 19, detent 18 is released and recorder arm 16 drops to produce a record and to open switch 15. These operations are repeated each cycle of operation until the drum 25 has traveled its own length towards the left, at which time the motor 30 is shut down. The record may then be studied at leisure.

The record represented on chart 26 indicates that the voltage of source 1 varied quite uniformly from a high value of about 200 volts to 140 volts during the recording period used. The recording interval or cycle may be slow or fast depending upon the speed of motor 23. A spring clock driving motor may be used. For the nature of use for which this modification is intended, a speed of three R. P. M. for shaft 22 and a record every 20 seconds would be suitable. The voltage source to be measured may be either D.-C. or peak value A.-C. The tube 5 can be made to fire on only one half cycle by means of a rectifier but with a record every 20 seconds and a 60-cycle source at 1 the maximum error that could occur because of this would be $$\frac{100}{20 \times 60}$$

per cent of scale range.

In Fig. 3 there is represented a continuous voltage recorder embodying my invention. A stationary resistance 12 across the voltage 1 to be measured and a movable brush contact 13 on resistance 12 connected through a slip ring and a brush 21 in series with the glow tube 5 and a relay are used as in Fig. 2. The relay of Fig. 3 performs a somewhat different function and is designated 38. The relay 38 operates contacts through which a motor 39 is energized and reversed. The motor 39 performs three functions. It drives the brush 13 back and forth over some part of resistance 12. It moves a marking stylus 40 back and forth over some portion of a record sheet 41 through pulleys 41', 42, and 43 and a wire belt 45 which is wrapped once around the pulley 41'. Motor 39 also advances the chart 41 through a one-way driving clutch at 46 and gears at 47 and 48. As represented, the motor 39 is of the split-phase A.-C. type having two winding and the switch operated by relay 38 is arranged alternately to select that winding of the motor which is energized through a condenser 49 for the two positions of the switch. The position of the switch shown is when the relay is deenergized and no current is flowing through glow tube 5. When so connected the motor operates in a direction to increase the voltage applied to the glow tube circuit, moving brush arm 13 counterclockwise and stylus 40 to the left. When the glow tube breaks down and passes current, relay 38 is energized, it reverses motor 39, and the brush arm 13 is driven clockwise to reduce the voltage on the glow tube circuit and moves stylus 40 to the right until the glow tube is extinguished. The chart 41 may be advanced during either direction of motor operation but for the record as shown the chart is advanced when stylus 40 is moving to the right and does not advance when the stylus moves to the left. The one-way clutch used at 46 may be of a type commonly used in metering devices, and one example thereof is designated by reference characters 68 and 69, Fig. 1 of United States Patent No. 2,048,477, July 21, 1936, to H. M. Witherow, and assigned to the same assignee as the present invention.

In Fig. 3 let it be assumed that the supply voltage at 1 to be measured and recorded is that of a generating system whereon it is desired to have a clearly legible record of the voltage, so as to keep it under good control; and that when the zigzag record produced by the apparatus falls between the lines 50 and 51 of the record sheet, normal voltage prevails. Thus, over the time period designated 52 the record shows the voltage to be accurate. When the voltage is normal, the line 50 marks the point where, when the voltage across tube 5 is being decreased, the tube extinguishes and ceases to pass current whereupon the relay 38 drops out and the motor 39 reverses. Also, when the voltage is normal, the line 51 marks the point where, when the voltage on the glow tube circuit is being increased, it fires or breaks down and passes current whereupon the relay 38 is energized and the motor 39 again reverses.

At about point 53 the record shows the beginning of a voltage disturbance which first caused a decrease in voltage from normal and then an increase in voltage from normal at point 54. It will be evident that during low voltage the arm 13 operates nearer the counterclockwise end of its resistance varying range and for high voltages nearer the clockwise end of its resistance varying range. If the glow tube has a breakdown voltage of 90 volts and an extinguishing voltage of 75 volts, the distance between lines 50 and 51 represents 15 volts variation in voltage across the glow tube. If the resistance 12 is uniform, it is evident that a similar calibration will hold for other portions of the chart. Thus, the record shows a maximum voltage below normal of about four volts near point 53 and a maximum voltage above normal of about 16 volts near point 54.

It is readily apparent that this voltage distance ratio laterally of the chart may be made almost anything desired as, for example, by changing the size of pulley 41 with other conditions remaining the same. Increasing the size of pulley 41 will increase the distance between normal voltage lines 50 and 51. The zigzag lines of the record will ordinarily be somewhat closer together in the direction of chart travel than has been represented for chart economy. The average rate of travel of the record sheet and the rate of travel of the stylus may also be made anything desired by the use of appropriate gearing between the motor 39 and the parts driven thereby. Thus, the distance between peaks of the record lengthwise of the chart can be made to correspond to 5 seconds or one minute or any other time value. The motor 39 is preferably a constant speed or synchronous motor, so that the advance of the chart will be fairly accurately timed and can have time graduations stamped thereon. To avoid possible damage to the apparatus in case of abnormal voltages, I may use limit switches as represented at 55 which are in the circuit of motor 39 and which will be opened by the outer insulated end of arm 13 in case operation is attempted beyond the voltage range of the apparatus. It is evident that I have provided a simple, rugged, low-cost recording voltmeter which gives good accuracy and exceptionally clear legibility, and is susceptible of wide variations as to range and calibration. Here again I wish to emphasize that the voltage point where the glow tube fires is probably more accurate than where it is extinguished. At the time the glow tube fires, there is no current flowing in its circuit, and variations in contact and other resistances in its circuit can have no influence until the tube actually breaks down. Thus in observing the record of Fig. 3, if the right-hand edge should appear to be somewhat ragged or irregular, it will be more important to hold the left-hand edge on line 51 than to hold the right-hand edge on line 50.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A recording voltmeter comprising a resistance adapted to be energized by and in proportion to the voltage to be measured, a contactor on said resistance, a glow tube and a relay connected in series between said contactor and one end of said resistance, motor means for producing relative movement between said contactor and resistance to vary the voltage impressed upon the glow tube circuit through a value where the tube will break down, said relay being operatively energized by the current through the glow tube circuit when the tube breaks down, a recorder comprising means for supporting a record sheet and a stylus for marking on such record sheet, said motor means also producing relative movement between the stylus and record sheet, the operation of said recorder being further subject to the control of said relay such that the relative positions of stylus and record sheet are recorded in terms of the voltage to be measured when said relay operates.

2. A recording voltmeter comprising a resistance adapted to be energized by and in proportion to the voltage to be recorded, a contactor movable over said resistance, means for supporting a record sheet, a stylus for recording on said record sheet, a reversible motor for moving said stylus back and forth over said sheet and the contactor back and forth over said resistance, a relay for controlling the energization and direction of rotation of said motor said relay being included in a circuit from said contactor to one end of said resistance, and a glow tube included in said relay circuit adapted to break down to energize the relay and reverse the motor as the voltage across the glow tube is increased and to be extinguished to deenergize the relay to again reverse the motor as the voltage across the glow tube is decreased.

3. A recording voltmeter comprising a resistance adapted to be energized by and in proportion to the voltage to be recorded, a contactor on said resistance, means for supporting a record sheet, a stylus for marking on the record sheet, a motor for producing relative movement between the stylus and record sheet and between the resistance and its contactor, a relay and a glow tube connected in series relation between said contactor and one end of said resistance, said parts being arranged to increase the voltage across the glow tube in response to the operation of the motor until the glow tube breaks down and energizes said relay, said stylus being subject to the control of said relay to produce a record so positioned on the record sheet as to correspond to the voltage across said resistance when said glow tube breaks down.

4. A recording voltmeter comprising a resistance adapted to be energized by and in proportion to the voltage to be recorded, a contactor on said resistance, means for supporting a record sheet and a stylus for producing a record on the record sheet, a motor for producing relative movement between the resistance and contactor and between the record sheet and stylus said relative movements being coordinated such that the position of the stylus relative to the record sheet is an indication of the position of the contactor relative to the resistance, a relay and a glow tube in series between said contactor and one end of said resistance, said motor causing the contactor to move in a manner to increase the voltage across the glow tube from below to breakdown value thereby producing a current flow which operates the relay, and means subject to the control of said relay for causing the stylus to produce a record on the record sheet indicative of the voltage across said resistance at the time of tube breakdown.

THEODORE A. RICH.

REFERENCES CITED

The following references are of record in the file of this patent:

UNITED STATES PATENTS

| Number | Name | Date |
|---|---|---|
| 1,685,667 | Davis | Sept. 25, 1928 |
| 1,741,006 | Agnew | Dec. 24, 1929 |
| 1,744,840 | Strieby | Jan. 28, 1930 |
| 1,753,330 | Bragg | Apr. 8, 1930 |
| 1,762,712 | Charlton | June 10, 1930 |
| 1,796,637 | Tragner | Mar. 17, 1931 |
| 1,918,834 | Crago | July 18, 1933 |
| 1,967,895 | Marvin | July 24, 1934 |
| 2,321,605 | Keinath | June 15, 1943 |